United States Patent
Miyatani et al.

(10) Patent No.: US 8,797,656 B2
(45) Date of Patent: Aug. 5, 2014

(54) ZOOM LENS AND IMAGE PICKUP APPARATUS

(71) Applicant: Sony Corporation, Tokyo (JP)

(72) Inventors: Sota Miyatani, Tokyo (JP); Kazuki Yonemoto, Saitama (JP); Hiroshi Omichi, Tokyo (JP); Atsuo Minato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/678,670

(22) Filed: Nov. 16, 2012

(65) Prior Publication Data
US 2013/0148009 A1    Jun. 13, 2013

(30) Foreign Application Priority Data

Dec. 13, 2011  (JP) .................................. 2011-272383

(51) Int. Cl.
*G02B 15/14*  (2006.01)
*H04N 5/225*  (2006.01)

(52) U.S. Cl.
USPC ............................ 359/683; 359/684; 348/340

(58) Field of Classification Search
CPC ...... G02B 15/14; G02B 15/16; G02B 15/173; H04N 5/225; H04N 5/232; H04N 5/23212
USPC .......... 348/340, 345, 347; 359/676, 683, 684
See application file for complete search history.

(56) References Cited

U.S. PATENT DOCUMENTS

| | | | |
|---|---|---|---|
| 2013/0033621 A1* | 2/2013 | Maruyama | 348/240.3 |
| 2013/0148004 A1* | 6/2013 | Miyatani et al. | 348/335 |
| 2013/0188088 A1* | 7/2013 | Miyatani et al. | 348/340 |

FOREIGN PATENT DOCUMENTS

JP    2009-175648    8/2009

* cited by examiner

*Primary Examiner* — David N Spector
(74) *Attorney, Agent, or Firm* — Rader, Fishman & Grauer PLLC

(57) ABSTRACT

A zoom lens includes, from the object side, a positionally-fixed first lens group having a positive refracting power, a second lens group having a negative refracting power and movable in an optical axis direction for zooming, a third lens group having a positive refracting power, and a fourth lens group movable in the optical axis direction. The first lens group includes a negative lens, a positive lens and another positive lens disposed in order from the object side and satisfies $$15.0 < ft/fw < 31.0 \quad (1)$$

$$7.0 < f1/fw < 13.0 \quad (2)$$

$$-8.5 < fL1/fw < -4.0 \quad (3)$$

where fw and ft are the focal lengths of the entire lens system in a wide angle end state and a telephoto end state, respectively, f1 is the focal length of the first lens group, and fL1 is the focal length of the negative lens of the first lens group.

14 Claims, 13 Drawing Sheets

ZOOM LENS AND IMAGE PICKUP APPARATUS

BACKGROUND

The present technology relates to a technical field of a zoom lens and an image pickup apparatus, and more particularly to a technical field of a zoom lens and an image pickup apparatus wherein both of increase in magnification and angle are achieved and besides reduction in diameter is achieved.

In recent years, small-sized image pickup apparatuses such as a video camera and a digital camera for consumer use have been widespread also for home use.

For such small-sized image pickup apparatus, a high-performance wide-angle zoom lens is demanded wherein the entire lens system is reduced in size and increased in magnification.

Generally, as a zoom lens used for a video camera, an inner focus type zoom lens is available wherein lens groups other than a first lens group disposed most on the object side are moved to carry out focusing. It is known that, in such an inner focus type zoom lens, the entire lens system can be reduced in size readily and besides an imaging performance suitable for an image pickup device having a large number of pixels is obtained.

In an inner focus type zoom lens, a four-group type inner zoom lens system is frequently used wherein a first lens group and a third lens group are fixed while a second lens group is moved in the direction of an optical axis to principally carry out zooming. Further, a fourth lens group is moved in the direction of the optical axis to carry out correction of the focal position by zooming and focusing. An inner focus type zoom lens is disclosed, for example, in Japanese Patent Laid-Open No. 2009-175648 (hereinafter referred to as Patent Document 1).

SUMMARY

However, such an inner focus type zoom lens as disclosed in Patent Document 1 has a problem that a lens of the first lens group has a great aperture in comparison with lenses of the other lens groups. Particularly if it is tried to realize a wide-angle configuration, then it is difficult to assure an amount of light and a performance at an angle of view of a most peripheral portion at a wide angle end position or a zoom position a little on the telephoto-end side from the wide angle end. Consequently, the diameter of the first lens group becomes great.

Further, if the diameter of the first lens group becomes great, then this gives rise to increase of the entire image pickup apparatus in the diametrical direction.

Therefore, it is desirable to provide a zoom lens and an image pickup apparatus by which both of increase in magnification and angle are achieved and besides reduction in diameter is achieved.

According to an embodiment of the present technology, there is provided a zoom lens including a first lens group having a positive refracting power and normally positioned at a fixed position, a second lens group having a negative refracting power and movable in a direction of an optical axis for zooming, a third lens group having a positive refracting power, and a fourth lens group movable in the direction of the optical axis for correction of a focal position by zooming and for focusing, the first, second, third and fourth lens groups being disposed in order from the object side to the image side, the first lens group comprising three lenses including a negative lens, a positive lens and another positive lens disposed in order from the object side to the image side and satisfying the following conditional expressions (1), (2) and (3):

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

Accordingly, in the zoom lens, the refracting power of the first lens group is optimized and appearance of an eclipse of a flux of light at an intermediate image height is suppressed.

Preferably, at least one face of the lenses of the first lens group is formed as an aspheric face.

Since at least one of the faces of the lenses of the first lens group is formed as an aspheric face, appearance of aberrations at the intermediate to telephoto end is suppressed.

Preferably, the fourth lens group has a positive refracting power.

Since the fourth lens group has a positive refracting power, appearance of aberrations at the wide angle end to telephoto end in the first to third lens groups is suppressed.

Preferably the zoom lens further includes a fifth lens group having a positive refracting power and disposed on the image side of the fourth lens group.

Since the fifth lens group having a positive refracting power is disposed on the image side of the fourth lens group, appearance of an eccentric aberration which appears upon vibration control and a curvature of field which occurs at the wide angle end can be suppressed.

According to another embodiment of the present technology, there is provided an image pickup apparatus including a zoom lens, and an image pickup device configured to convert an optical image formed by the zoom lens into an electric signal, the zoom lens including a first lens group having a positive refracting power and normally positioned at a fixed position, a second lens group having a negative refracting power and movable in a direction of an optical axis for zooming, a third lens group having a positive refracting power, and a fourth lens group movable in the direction of the optical axis for correction of a focal position by zooming and for focusing, the first, second, third and fourth lens groups being disposed in order from the object side to the image side, the first lens group comprising three lenses including a negative lens, a positive lens and another positive lens disposed in order from the object side to the image side and satisfying the following conditional expressions (1), (2) and (3):

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

Accordingly, in the image pickup apparatus, the refracting power of the first lens group is optimized and appearance of an eclipse of a flux of light at an intermediate image height is suppressed.

Preferably, a reading out region of the image pickup device is changed within a predetermined zooming interval in an intermediate zoom region.

By varying the reading out region of the image pickup device in the predetermined zooming interval in the intermediate zoom region, a distorted variation of the zoom speed during zooming can be suppressed.

In summary, with the zoom lens and the image pickup apparatus according to the embodiment of the present technology, both of increase in magnification and angle can be achieved and besides reduction in diameter can be achieved.

DETAILED DESCRIPTION OF THE PREFERRED EMBODIMENTS

Figure 1:
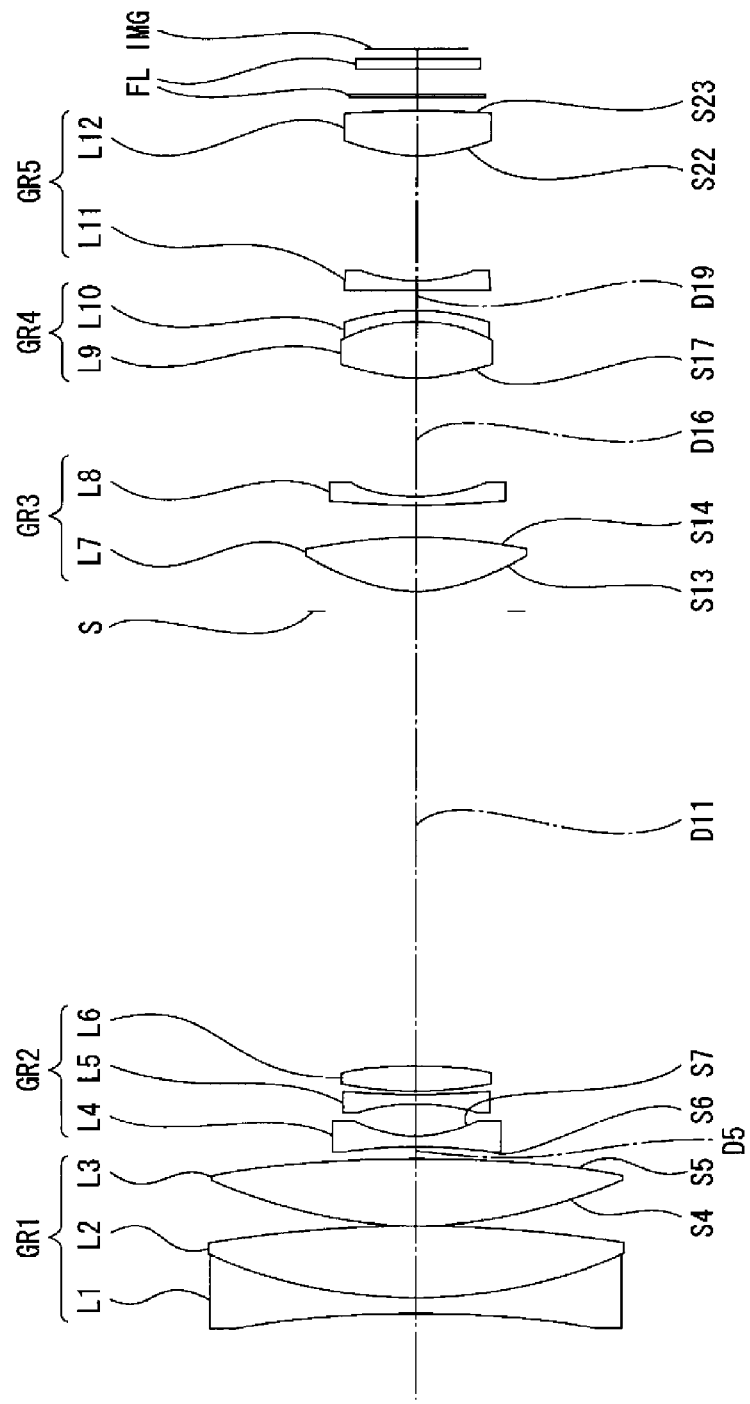
FIG. 1 is a schematic view showing a lens configuration of a zoom lens according to a first embodiment of the present technology.

In the following, a zoom lens and an image pickup apparatus according to preferred embodiments of the present technology are described.

In the zoom lens and the image pickup apparatus according to the embodiment of the present technology, a wide angle of view of 33 mm or less in an equivalent angle of view of 35 mm can be assured and a zoom ratio around 20 to 30 times can be assured.

[Configuration of the Zoom Lens]

The zoom lens according to the embodiment of the present technology includes a first lens group having a positive refracting power and normally positioned at a fixed position, a second lens group having a negative refracting power and movable in the direction of an optical axis for zooming, a third lens group having a positive refracting power, and a fourth lens group movable in the direction of the optical axis for correction of a focal position by zooming and for focusing, the first, second, third and fourth lens groups being disposed in order from the object side to the image side, the first lens group comprising three lenses including a negative lens, a positive lens and another positive lens disposed in order from the object side to the image side and satisfying the following conditional expressions (1), (2) and (3):

$$15.0 < ft/fw < 31.0 \qquad (1)$$

$$7.0 < f1/fw < 13.0 \qquad (2)$$

$$-8.5 < fL1/fw < -4.0 \qquad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

The conditional expression (1) defines a ratio in focal length of the entire lens system in the wide angle end state and the telephoto end state.

The conditional expression (2) relates to the focal length of the first lens group.

If the upper limit of the conditional expression (2) is exceeded, then the refracting power of the first lens group becomes excessively low and the size of the first lens group in the diametrical direction becomes extremely great. Further, an adverse effect that a flux of light is eclipsed by a great amount at an intermediate image height occurs.

On the contrary, if the lower limit of the conditional expression (2) is exceeded, then although reduction in diameter of the first lens group is possible, the refracting power of the first lens group becomes excessively high and aberration correction becomes difficult.

The conditional expression (3) defines the ratio between the focal length of the negative lens of the first lens group and the focal length of the entire lens system at the wide angle end.

If the lower limit of the conditional expression (3) is exceeded, then the action of decreasing the light flux height becomes weak, resulting in difficulty to achieve reduction in diameter.

If the upper limit of the conditional expression (3) is exceeded conversely, then the refracting power of the negative lens of the first lens group becomes excessively high, resulting in difficulty in aberration correction.

Accordingly, the zoom lens according to the embodiment of the present technology has a high resolution which can sufficiently satisfy a wide angle of 33 mm or less in an equivalent angle of view of 35 mm, increase of magnification around 20 to 30 times and a high density (HD) and besides can achieve reduction in diameter.

Further, the height of a flux of light over an overall range of the zoom region can be lowered to achieve reduction in diameter and carry out good aberration correction.

In the zoom lens according to the embodiment of the present technology, at least one face of the lenses of the first lens group is formed as an aspheric face.

Where at least one face of the lenses of the first lens group is formed as an aspheric face, aberrations at a position from an intermediate position to the telephoto end can be corrected efficiently.

In the zoom lens according to the embodiment of the present technology, the fourth lens group preferably has a positive refracting power.

Where the fourth lens group has a positive refracting power, various aberrations which arise in the first to third lens groups wherein the refracting power is defined by the conditional expressions (1) to (3) can be corrected efficiently with the range from the wide angle end to the telephoto end.

In the zoom lens according to the embodiment of the present technology, preferably a fifth lens group having a positive refracting power is disposed on the image side of the fourth lens group.

Where the fifth lens group having a positive refracting power is disposed on the image side of the fourth lens group, an eccentric aberration which occurs upon vibration control and a curvature of field which occurs at the wide angle end can be corrected efficiently.

[Working Examples of Numerical Values of the Zoom Lens]

In the following, a particular embodiment of the zoom lens according to the embodiment of the present technology and several examples of numerical values wherein particular numerical values are applied to the zoom lens of the embodiment are described with reference to the accompanying drawings and tables.

It is to be noted that the symbols used in the tables and the following description have the following meanings and so forth.

"Face number" is a face number of the ith face as counted from the object side toward the image side; "Ri" the paraxial radius of curvature of the ith face; "Di" the on-axis face distance between the ith face and the i+1th face, namely the thickness of the center or the air distance of the lens; "Ni" the refractive index at the d-line ($\lambda$=587.6 nm) of the lens or the like beginning with the ith face; and "vi" the Abbe number at the d-line of the lens or the like beginning with the ith face.

"Aspheric" of the "Face number" represents that the face is an aspheric face; "Infinity" of "Ri" represents that the face is a flat face; and "Variable" of "Di" represents that the on-axis face distance is a variable distance.

"$\kappa$" is the conic constant, and "A4," "A6," "A8" and "A10" are the fourth, sixth, eighth and tenth order aspheric coefficients.

"f" is the focal length; "Fno." the F number; and "$\omega$" the half angle of view.

It is to be noted that, in the tables given below in which the aspheric coefficient is included, "E-n" represents an exponential notation to the base 10, namely "$10^{-n}$," and for example, "0.12345E-05" represents "0.12345×$10^{-5}$."

The zoom lenses used in the embodiments include an aspheric lens face. Where "x" is the distance or sag amount in the direction of the optical axis from the vertex of the lens face; "y" the height, namely, the image height, in a direction perpendicular to the direction of the optical axis; "c" the paraxial radius of curvature at the vertex of the lens, namely, a reciprocal number to the radius of curvature; "$\kappa$" the conic constant; and "A," "B," "C," "D" and "E" the fourth, sixth, eighth, tenth and twelfth aspheric coefficients, the aspheric face shape is defined by the following expression 1:

$$x = \frac{cy^2}{1+\{1-(1+\kappa)c^2y^2\}^{1/2}} + A2y^2 + A4y^2 + A6y^2 \quad \text{(expression 1)}$$

First Embodiment

FIG. 1 shows a lens configuration of a zoom lens 1 according to a first embodiment of the present technology.

Referring to FIG. 1, the zoom lens 1 includes a first lens group GR1 having a positive refracting power, a second lens group GR2 having a negative refracting power, a third lens group GR3 having a positive refracting power, a fourth lens group GR4 having a positive refracting power, and a fifth lens group GR5 having a positive refracting power. The first lens group GR1, second lens group GR2, third lens group GR3, fourth lens group GR4 and fifth lens group GR5 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 1 has a zoom ratio set to 17.5 times.

The first lens group GR1 is configured from three lenses including a cemented lens of a negative lens L1 and a positive lens L2 and a positive lens L3, disposed in order from the object side to the image side.

The second lens group GR2 is configured from three lenses including a negative lens L4 and a cemented lens of a negative lens L5 and a positive lens L6, disposed in order from the object side to the image side.

The third lens group GR3 is configured from two lenses including a positive lens L7 and a negative lens L8 disposed in order from the object side to the image side.

The fourth lens group GR4 is configured from a cemented lens of a positive lens L9 positioned on the object side and a negative lens L10 positioned on the image side.

The fifth lens group GR5 is configured from a movable group configured from a negative lens L11 and movable in a direction perpendicular to the optical axis for vibration control and a fixed group configured from a positive lens L12 and normally positioned at a fixed position. The movable group and the fixed group are disposed in order from the object side to the image side.

A filter FL is disposed between the fifth lens group GR5 and an image plane IMG. An aperture stop S is disposed in the proximity of the third lens group GR3 on the object side.

Table 1 indicates lens data of the numerical value example 1 wherein particular numerical values are applied to the zoom lens 1 according to the first embodiment.

TABLE 1

| Face number | Ri | Di | Ni | vi |
|---|---|---|---|---|
| 1 | −54.569 | 0.700 | 1.911 | 35.250 |
| 2 | 23.176 | 3.559 | 1.729 | 54.673 |
| 3 | −57.948 | 0.100 | | |
| 4(Aspheric) | 23.122 | 3.222 | 1.729 | 54.041 |
| 5(Aspheric) | −56.955 | Variable | | |
| 6(Aspheric) | −29.448 | 0.550 | 1.911 | 35.250 |
| 7(Aspheric) | 5.609 | 1.572 | | |
| 8 | −9.872 | 0.450 | 1.883 | 40.805 |
| 9 | 32.101 | 1.416 | | |

TABLE 1-continued

| Face number | Ri | Di | Ni | vi |
|---|---|---|---|---|
| 10 | 18.108 | 1.251 | 1.946 | 17.984 |
| 11 | −18.732 | Variable | | |
| 12(Aperture stop) | Infinity | 1.000 | | |
| 13(Aspheric) | 8.108 | 2.610 | 1.694 | 53.201 |
| 14(Aspheric) | −21.213 | 1.534 | | |
| 15 | 40.000 | 0.450 | 2.001 | 13.400 |
| 16 | 8.139 | Variable | | |
| 17(Aspheric) | 9.647 | 2.765 | 1.592 | 67.023 |
| 18 | −7.671 | 0.500 | 1.847 | 23.785 |
| 19 | −11.727 | Variable | | |
| 20 | 2546.417 | 0.500 | 1.652 | 58.404 |
| 21 | 8.883 | 6.080 | | |
| 22(Aspheric) | 10.251 | 2.200 | 1.592 | 67.023 |
| 23(Aspheric) | −18.735 | 0.689 | | |
| 24 | Infinity | 0.100 | 1.517 | 64.198 |
| 25 | Infinity | 1.270 | | |
| 26 | Infinity | 0.500 | 1.517 | 64.198 |
| 27 | Infinity | 0.530 | | |
| IMG | Infinity | 0 | | |

In the zoom lens 1, the opposite faces of the positive lens L3 of the first lens group GR1, namely, the fourth and fifth faces, the opposite faces of the negative lens L4 of the second lens group GR2, namely, the sixth and seventh faces, the opposite faces of the positive lens L7 of the third lens group GR3, namely, the thirteenth and fourteenth faces, the face on the object side of the positive lens L9 of the fourth lens group GR4, namely, the seventeenth face, and the opposite faces of the positive lens L12 of the fifth lens group GR5, namely, the 22nd and 23rd faces, are formed as aspheric faces. The fourth, sixth, eighth and tenth order aspheric coefficients A4, A6, A8 and A10 of the aspheric faces in the numerical value example 1 are indicated in Table 2 together with the conic constant κ.

TABLE 2

| Face number | κ | A4 | A6 | A8 | A10 |
|---|---|---|---|---|---|
| 4 | 0 | −3.674E−06 | −1.353E−08 | −7.607E−11 | −5.842E−13 |
| 5 | 0 | 1.166E−05 | −2.832E−08 | −6.726E−11 | −2.126E−14 |
| 6 | 0 | −5.584E−04 | 5.403E−05 | −1.809E−06 | 2.793E−08 |
| 7 | 0 | −1.096E−03 | 4.709E−05 | 0.000E+00 | 0.000E+00 |
| 13 | 0 | −3.525E−04 | 6.352E−07 | −3.908E−08 | −1.515E−09 |
| 14 | 0 | −3.283E−05 | 8.050E−06 | −2.531E−07 | 2.323E−09 |
| 17 | 0 | −3.917E−04 | 7.937E−06 | −3.290E−07 | 6.700E−09 |
| 22 | 0 | 1.565E−03 | −1.369E−05 | −6.869E−06 | 1.415E−07 |
| 23 | 0 | 3.800E−03 | −4.518E−05 | −2.253E−05 | 8.942E−07 |

In the zoom lens 1, upon zooming between the wide angle end state and the telephoto end state, the face distance D5 between the first lens group GR1 and the second lens group GR2, the face distance D11 between the second lens group GR2 and the aperture stop S, the face distance D16 between the third lens group GR3 and the fourth lens group GR4 and the face distance D19 between the fourth lens group GR4 and the fifth lens group GR5 vary. The variable distances in the wide angle end state, an intermediate focal length state and the telephoto end state among the face distances in the numerical value example 1 are indicated in Table 3 together with the focal length f, F number Fno. and half angle ω of view.

TABLE 3

| | Wide angle end | Intermediate | Telephoto end |
|---|---|---|---|
| f | 3.200 | 13.387 | 56.00 |
| Fno. | 1.85 | 2.70 | 3.50 |
| ω | 38.1 | 8.1 | 2.3 |
| D5 | 0.600 | 14.308 | 22.091 |
| D11 | 22.291 | 8.584 | 0.800 |
| D16 | 5.829 | 2.647 | 4.326 |
| D19 | 1.000 | 4.182 | 2.503 |

Figure 2:
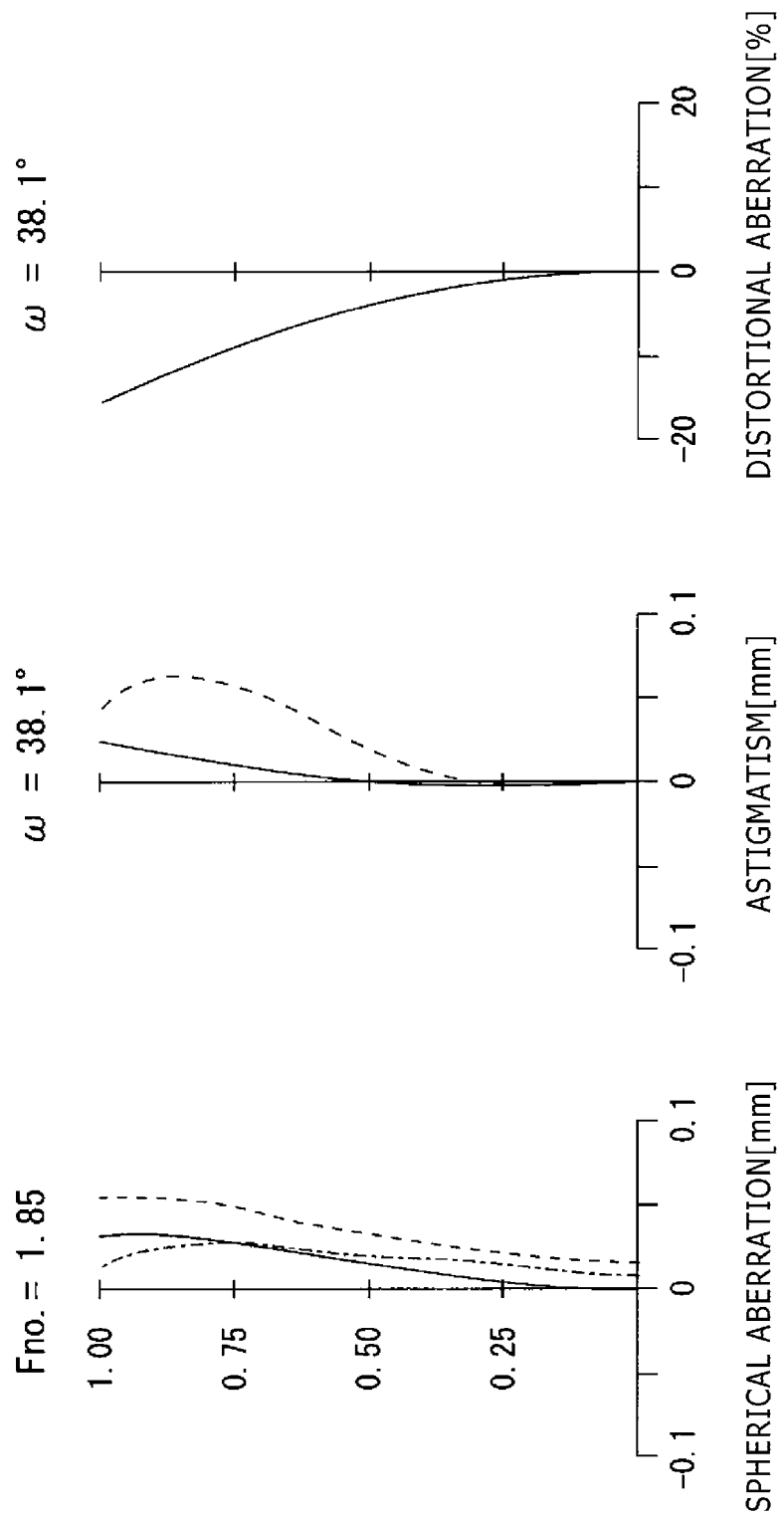
FIG. 2 is a diagrammatic view illustrating a spherical aberration, an astigmatism and a distortional aberration in a wide angle end state of the zoom lens of FIG. 1 according to a numerical value example wherein particular numerical values are applied to the zoom lens.
Figure 3:
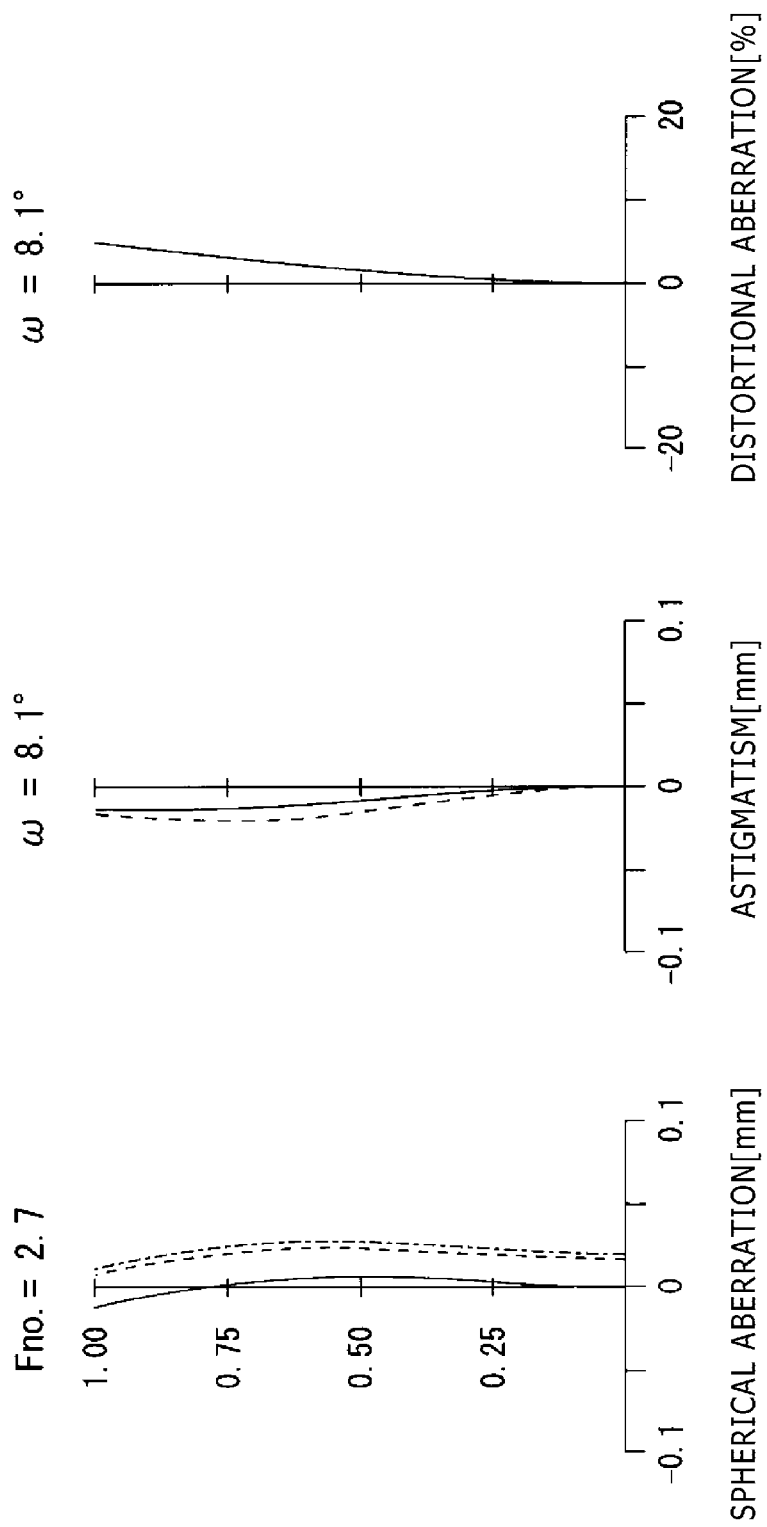
FIG. 3 is a similar view but illustrating a spherical aberration, an astigmatism and a distortional aberration in an intermediate focal length state of the zoom lens of FIG. 1.
Figure 4:
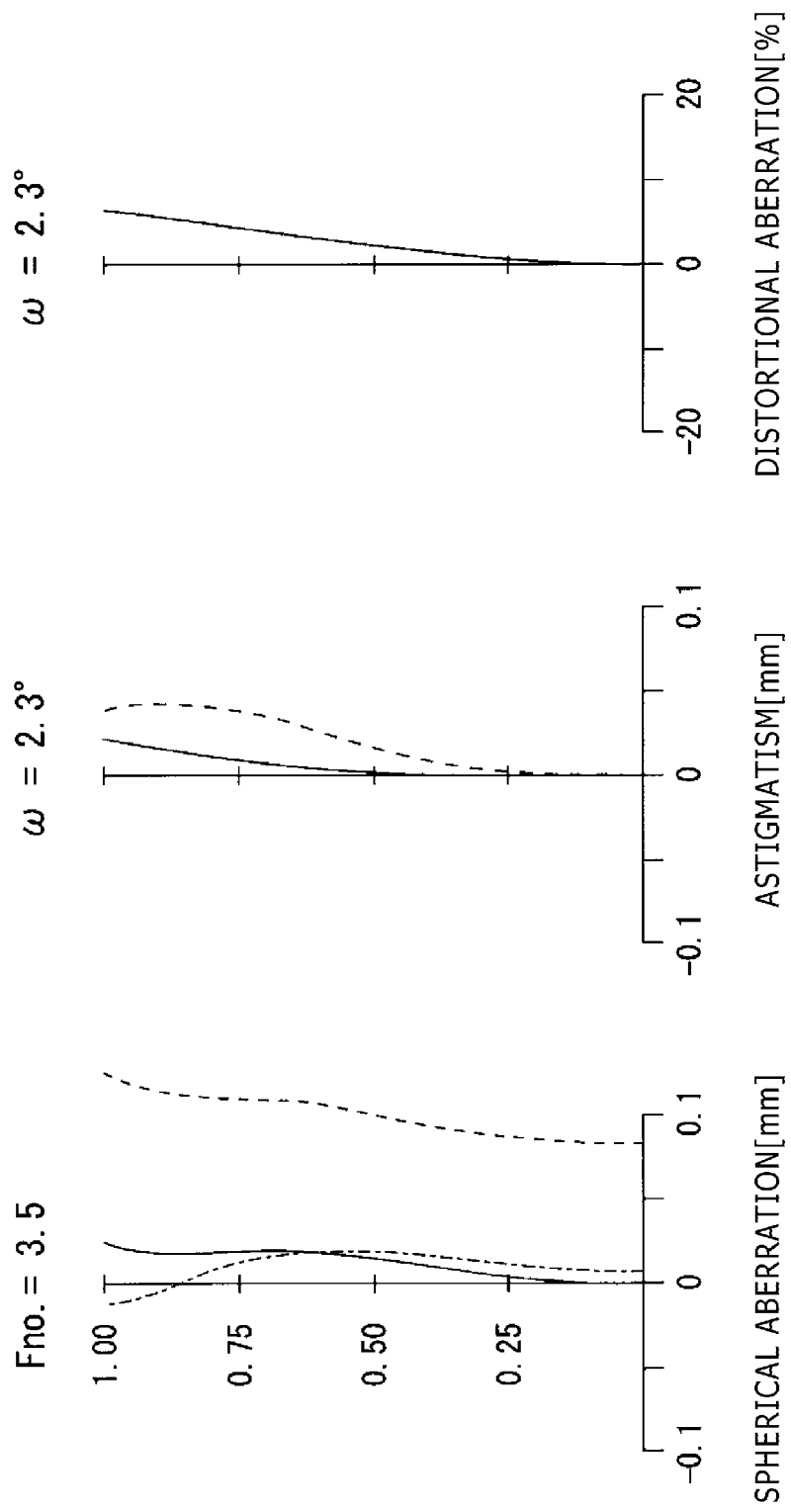
FIG. 4 is a similar view but illustrating a spherical aberration, an astigmatism and a distortional aberration in a telephoto end state of the zoom lens of FIG. 1.

FIGS. 2 to 4 illustrate various aberrations in an infinitely remotely focused state in the numerical value example 1. Particularly, FIG. 2 illustrates various aberrations in the wide angle end state; FIG. 3 illustrates various aberrations in an intermediate focal length state; and FIG. 4 illustrates various aberrations in the telephoto end state.

In spherical aberration diagrams of FIGS. 2 to 4, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In astigmatism diagrams, a solid line curve indicates values on the sagittal image plane of the d line; and a broken line curve indicates values on the meridional image plane of the d line. In distortional aberration diagrams, a solid line indicates values on the d line.

From the aberration diagrams, it can be recognized apparently that the numeral value example 1 has a superior imaging performance in that the aberrations are corrected favorably.

Second Embodiment

Figure 5:
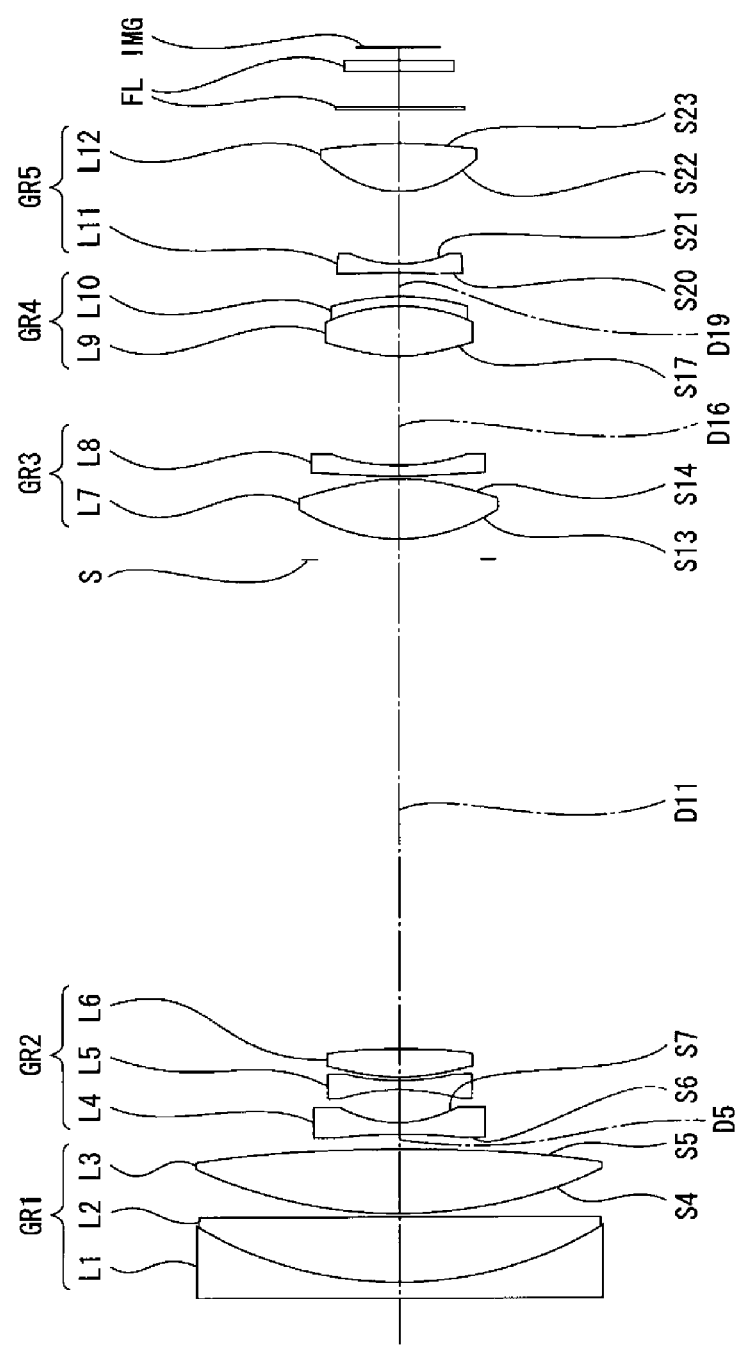
FIG. 5 is a schematic view showing a lens configuration of a zoom lens according to a second embodiment of the present technology.

FIG. 5 shows a lens configuration of a zoom lens 2 according to a second embodiment of the present technology.

Referring to FIG. 5, the zoom lens 2 includes a first lens group GR1 having a positive refracting power, a second lens group GR2 having a negative refracting power, a third lens group GR3 having a positive refracting power, a fourth lens group GR4 having a positive refracting power, and a fifth lens group GR5 having a positive refracting power. The first lens group GR1, second lens group GR2, third lens group GR3, fourth lens group GR4 and fifth lens group GR5 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 2 has a zoom ratio set to 23.0 times.

The first lens group GR1 is configured from three lenses including a cemented lens of a negative lens L1 and a positive lens L2 and a positive lens L3, disposed in order from the object side to the image side.

The second lens group GR2 is configured from three lenses including a negative lens L4, a negative lens L5 and a positive lens L6, disposed in order from the object side to the image side.

The third lens group GR3 is configured from two lenses including a positive lens L7 and a negative lens L8 disposed in order from the object side to the image side.

The fourth lens group GR4 is configured from a cemented lens of a positive lens L9 positioned on the object side and a negative lens L10 positioned on the image side.

The fifth lens group GR5 is configured from a movable group configured from a negative lens L11 and movable in a direction perpendicular to the optical axis for vibration control and a fixed group configured from a positive lens L12 and normally positioned at a fixed position. The movable group and the fixed group are disposed in order from the object side to the image side.

A filter FL is disposed between the fifth lens group GR5 and an image plane IMG. An aperture stop S is disposed in the proximity of the third lens group GR3 on the object side.

Table 4 indicates lens data of the numerical value example 2 wherein particular numerical values are applied to the zoom lens 2 according to the second embodiment.

TABLE 4

| Face number | Ri | Di | Ni | vi |
|---|---|---|---|---|
| 1 | −797.919 | 0.600 | 1.911 | 35.250 |
| 2 | 15.899 | 2.778 | 1.729 | 54.673 |
| 3 | 2363.775 | 0.100 | | |
| 4(Aspheric) | 19.337 | 2.723 | 1.729 | 54.041 |
| 5(Aspheric) | −56.172 | Variable | | |
| 6(Aspheric) | −40.356 | 0.500 | 1.911 | 35.250 |
| 7(Aspheric) | 4.597 | 1.312 | | |
| 8 | −9.400 | 0.450 | 1.883 | 40.805 |
| 9 | 12.264 | 0.100 | | |
| 10 | 10.393 | 1.175 | 1.946 | 17.984 |
| 11 | −23.840 | Variable | | |
| 12(Aperture stop) | Infinity | 0.800 | | |
| 13(Aspheric) | 6.211 | 2.500 | 1.589 | 61.251 |
| 14(Aspheric) | −9.536 | 0.204 | | |
| 15 | 63.000 | 0.400 | 1.883 | 40.805 |
| 16 | 7.995 | Variable | | |
| 17(Aspheric) | 8.351 | 2.000 | 1.593 | 68.624 |
| 18 | −7.457 | 0.400 | 2.003 | 19.317 |
| 19 | −10.638 | Variable | | |
| 20(Aspheric) | −24.823 | 0.400 | 1.804 | 46.503 |
| 21(Aspheric) | 5.297 | 2.961 | | |
| 22(Aspheric) | 4.136 | 2.000 | 1.497 | 81.560 |
| 23(Aspheric) | −12.582 | 1.400 | | |
| 24 | Infinity | 0.100 | 1.517 | 64.198 |
| 25 | Infinity | 1.500 | | |
| 26 | Infinity | 0.500 | 1.517 | 64.198 |
| IMG | Infinity | 0.530 | | |
| IMG | Infinity | 0.000 | | |

In the zoom lens 2, the opposite faces of the positive lens L3 of the first lens group GR1, namely, the fourth and fifth faces, the opposite faces of the negative lens L4 of the second lens group GR2, namely, the sixth and seventh faces, the opposite faces of the positive lens L7 of the third lens group GR3, namely, the thirteenth and fourteenth faces, the face on the object side of the positive lens L9 of the fourth lens group GR4, namely, the seventeenth face, the opposite faces of the negative lens L11 of the fifth lens group GR5, namely, the 20th and 21st faces, and the opposite faces of the positive lens L12 of the fifth lens group GR5, namely, the 22nd and 23rd faces, are formed as aspheric faces. The fourth, sixth, eighth and tenth order aspheric coefficients A4, A6, A8 and A10 of the aspheric faces in the numerical value example 2 are indicated in Table 5 together with the conic constant κ.

TABLE 5

| Face number | κ | A4 | A6 | A8 | A10 |
|---|---|---|---|---|---|
| 4 | 0 | 1.304E−05 | −2.868E−07 | 1.262E−09 | −8.314E−13 |
| 5 | 0 | 3.795E−05 | −4.616E−07 | 3.375E−09 | −1.007E−11 |
| 6 | 0 | −1.647E−03 | 1.842E−04 | −6.985E−06 | 6.537E−08 |
| 7 | 0 | −2.627E−03 | 1.791E−04 | 0.000E+00 | 0.000E+00 |

TABLE 5-continued

| Face number | κ | A4 | A6 | A8 | A10 |
|---|---|---|---|---|---|
| 13 | 0 | −7.019E−04 | −1.914E−05 | 1.327E−06 | −5.512E−08 |
| 14 | 0 | 6.510E−04 | −1.084E−05 | 1.121E−06 | −4.779E−08 |
| 17 | 0 | −4.205E−04 | 8.838E−06 | −8.723E−07 | 3.380E−08 |
| 20 | 0 | 2.355E−03 | 9.651E−05 | −8.732E−06 | 0.000E+00 |
| 21 | 0 | 1.681E−03 | 1.919E−04 | −1.743E−06 | 0.000E+00 |
| 22 | 0 | 7.245E−04 | −9.074E−05 | −3.705E−06 | −3.547E−07 |
| 23 | 0 | 4.525E−03 | −2.676E−04 | −9.155E−06 | 8.810E−07 |

In the zoom lens 2, upon zooming between the wide angle end state and the telephoto end state, the face distance D5 between the first lens group GR1 and the second lens group GR2, the face distance D11 between the second lens group GR2 and the aperture stop S, the face distance D16 between the third lens group GR3 and the fourth lens group GR4 and the face distance D19 between the fourth lens group GR4 and the fifth lens group GR5 vary. The variable distances in the wide angle end state, an intermediate focal length state and the telephoto end state among the face distances in the numerical value example 2 are indicated in Table 6 together with the focal length f, F number Fno. and half angle ω of view.

TABLE 6

| | Wide angle end | Intermediate | Telephoto end |
|---|---|---|---|
| f | 2.20 | 10.55 | 50.60 |
| Fno. | 1.85 | 2.34 | 3.50 |
| ω | 37.9 | 6.37 | 1.8 |
| D5 | 0.604 | 13.626 | 20.158 |
| D11 | 20.355 | 7.333 | 0.800 |
| D16 | 4.598 | 2.243 | 3.505 |
| D19 | 1.010 | 3.365 | 2.104 |

Figure 6:
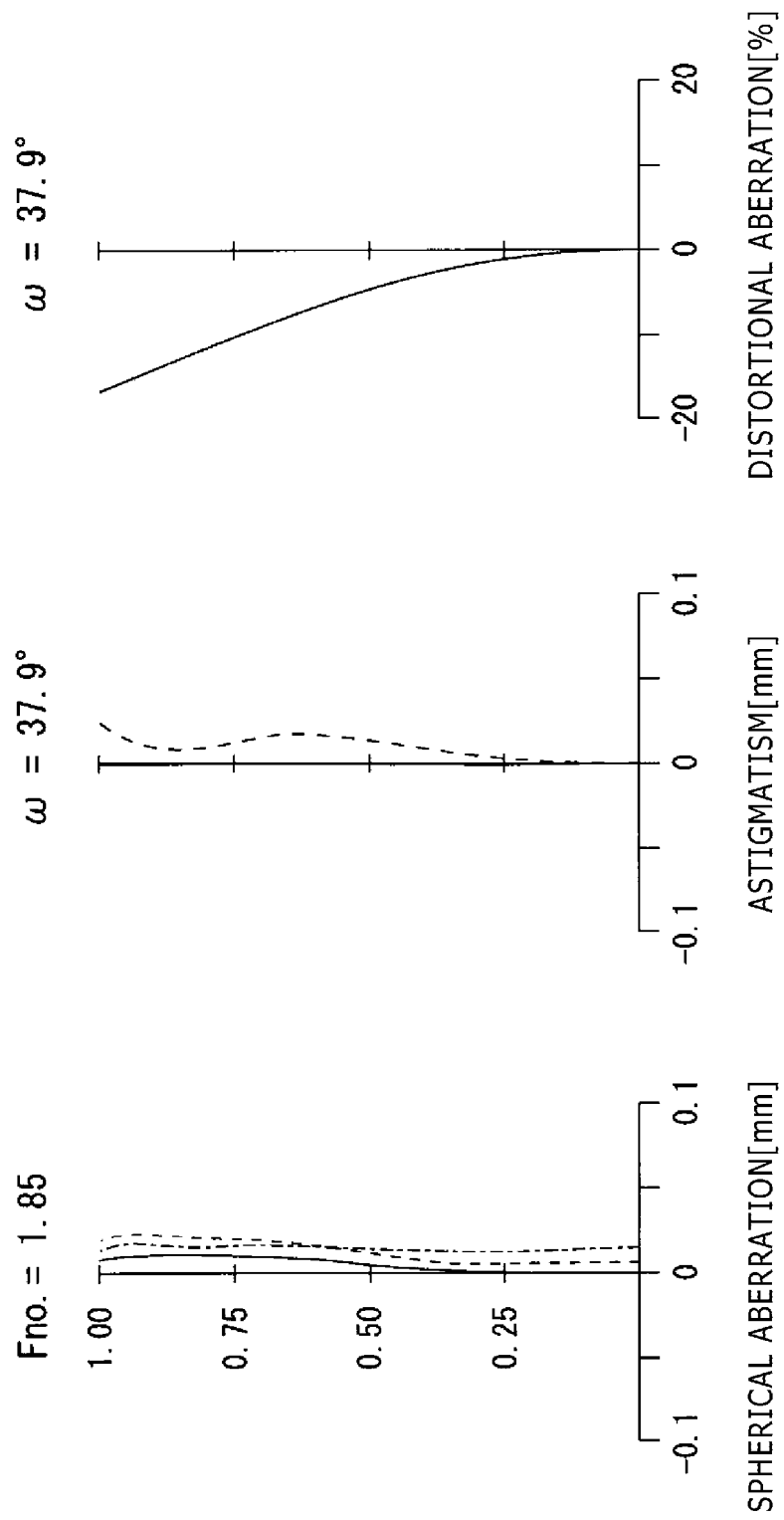
FIG. 6 is a diagrammatic view illustrating a spherical aberration, an astigmatism and a distortional aberration in a wide angle end state of the zoom lens of FIG. 5 according to a numerical value example wherein particular numerical values are applied to the zoom lens.
Figure 7:
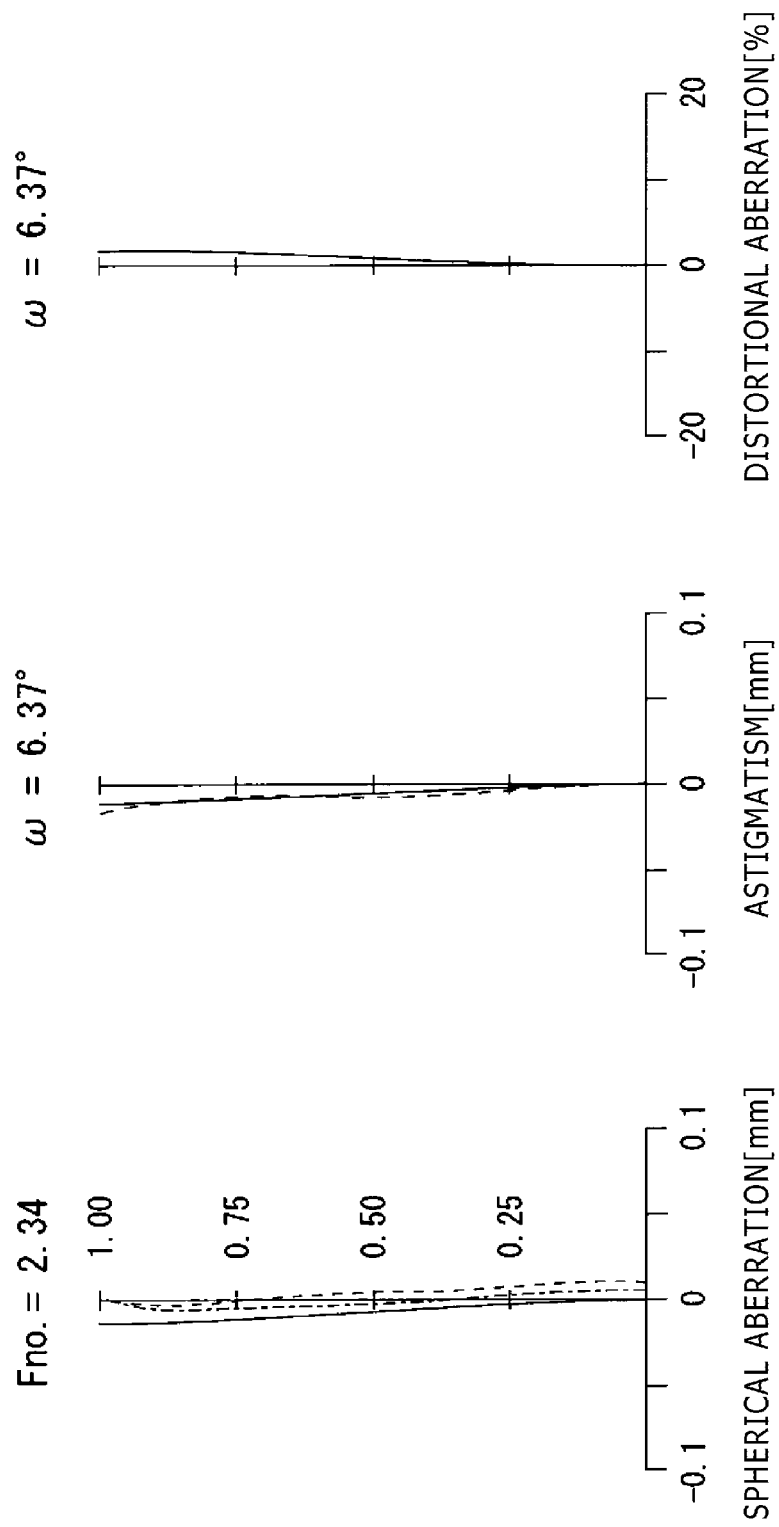
FIG. 7 is a similar view but illustrating a spherical aberration, an astigmatism and a distortional aberration in an intermediate focal length state of the zoom lens of FIG. 5.
Figure 8:
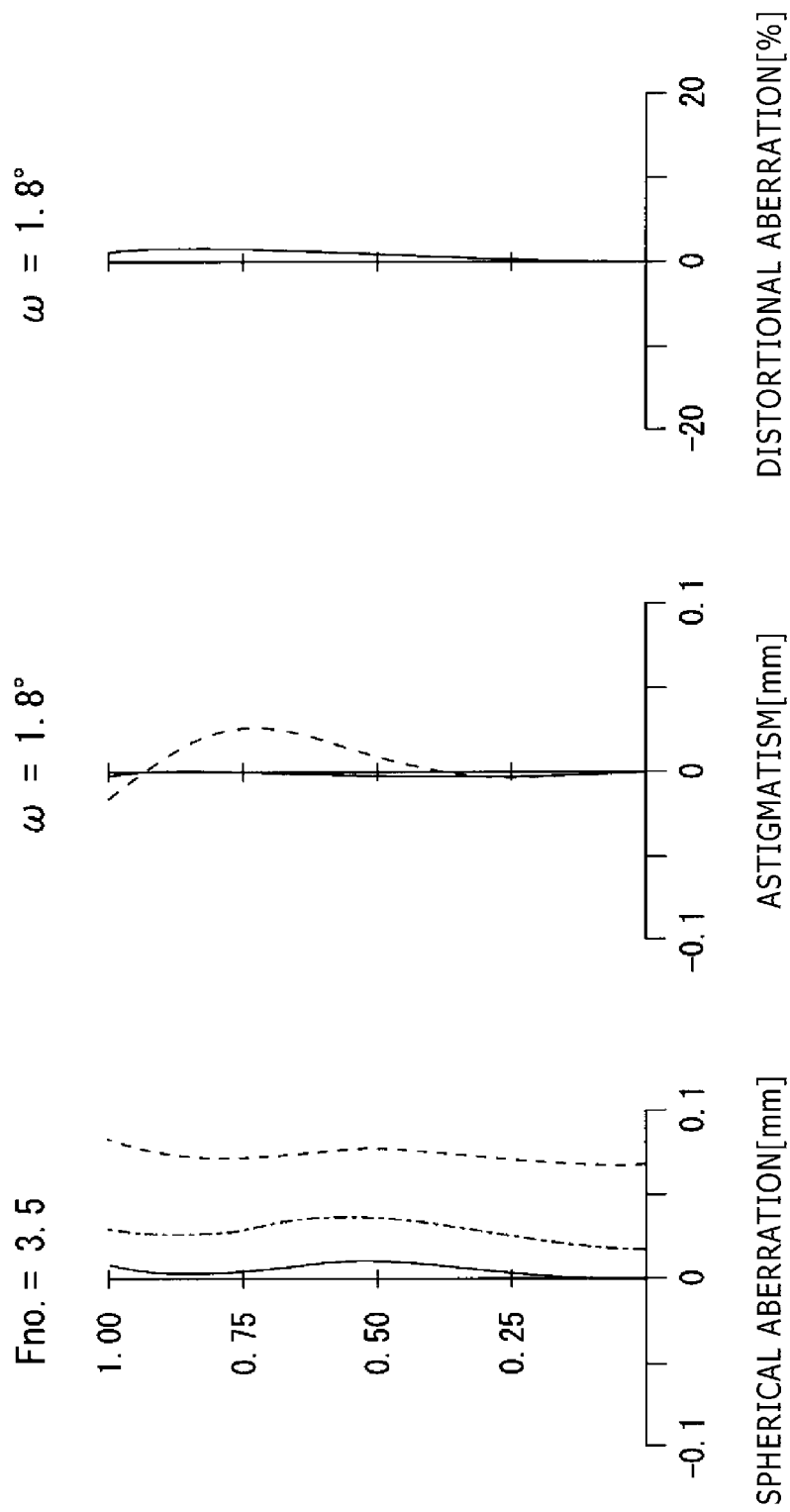
FIG. 8 is a similar view but illustrating a spherical aberration, an astigmatism and a distortional aberration in a telephoto end state of the zoom lens of FIG. 5.

FIGS. 6 to 8 illustrate various aberrations in an infinitely remotely focused state in the numerical value example 2. Particularly, FIG. 6 illustrates various aberrations in the wide angle end state; FIG. 7 illustrates various aberrations in an intermediate focal length state; and FIG. 8 illustrates various aberrations in the telephoto end state.

In spherical aberration diagrams of FIGS. 6 to 8, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In astigmatism diagrams, a solid line curve indicates values on the sagittal image plane of the d line; and a broken line curve indicates values on the meridional image plane of the d line. In distortional aberration diagrams, a solid line indicates values on the d line.

From the aberration diagrams, it can be recognized apparently that the numeral value example 2 has a superior imaging performance in that the aberrations are corrected favorably.

Third Embodiment

Figure 9:
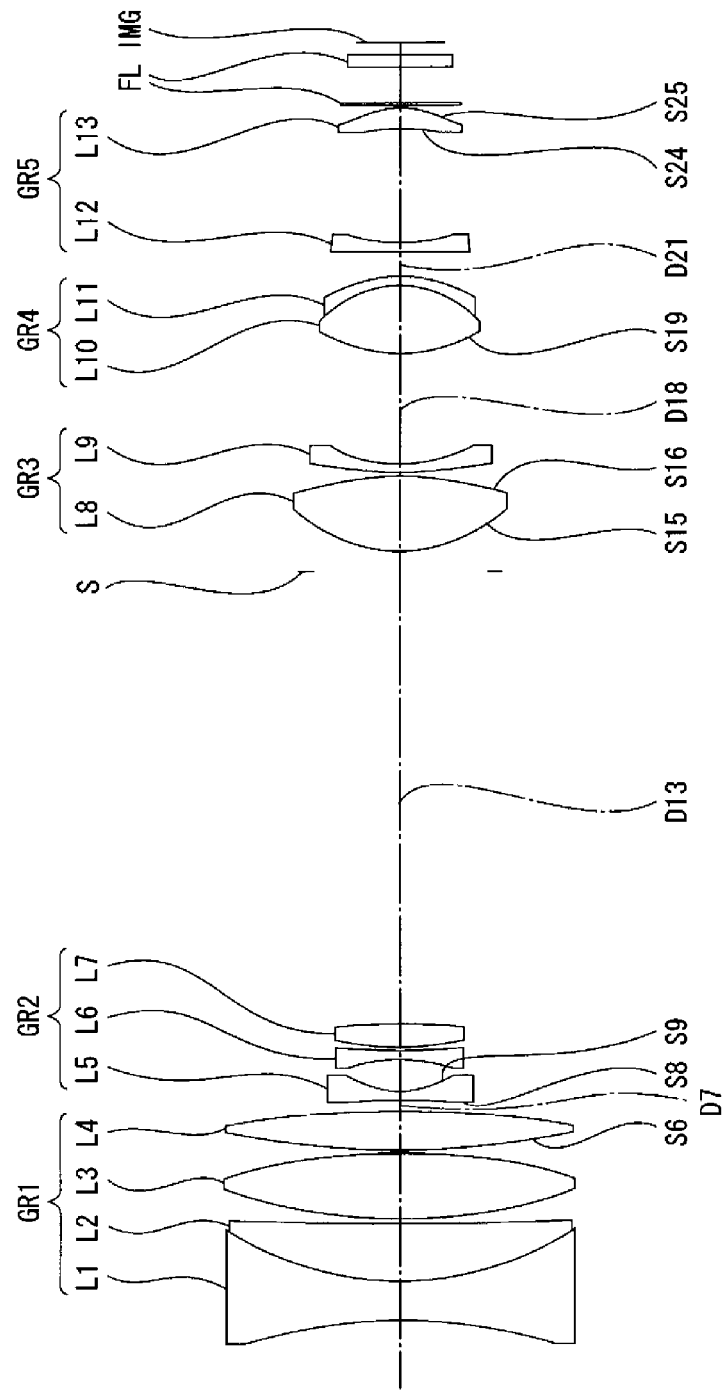
FIG. 9 is a schematic view showing a lens configuration of a zoom lens according to a third embodiment of the present technology.

FIG. 9 shows a lens configuration of a zoom lens 3 according to a third embodiment of the present technology.

Referring to FIG. 9, the zoom lens 3 includes a first lens group GR1 having a positive refracting power, a second lens group GR2 having a negative refracting power, a third lens group GR3 having a positive refracting power, a fourth lens group GR4 having a positive refracting power, and a fifth lens group GR5 having a positive refracting power. The first lens group GR1, second lens group GR2, third lens group GR3, fourth lens group GR4 and fifth lens group GR5 are disposed in order from the object side to the image side.

The first lens group GR1 is normally positioned at a fixed position, and the second lens group GR2 is movable in a direction of an optical axis for zooming. The third lens group GR3 is normally positioned at a fixed position, and the fourth lens group GR4 is movable in a direction of the optical axis for correction of the focal position by zooming and for focusing.

The zoom lens 3 has a zoom ratio set to 26.5 times.

The first lens group GR1 is configured from four lenses including a cemented lens of a negative lens L1 and a positive lens L2, a positive lens L3 and a positive lens L4, disposed in order from the object side to the image side.

The second lens group GR2 is configured from three lenses including a negative lens L5, a negative lens L6 and a positive lens L7, disposed in order from the object side to the image side.

The third lens group GR3 is configured from two lenses including a positive lens L8 and a negative lens L9 disposed in order from the object side to the image side.

The fourth lens group GR4 is configured from a cemented lens of a positive lens L10 positioned on the object side and a negative lens L11 positioned on the image side.

The fifth lens group GR5 is configured from a movable group configured from a negative lens L12 and movable in a direction perpendicular to the optical axis for vibration control and a fixed group configured from a positive lens L13 and normally positioned at a fixed position. The movable group and the fixed group are disposed in order from the object side to the image side.

A filter FL is disposed between the fifth lens group GR5 and an image plane IMG. An aperture stop S is disposed in the proximity of the third lens group GR3 on the object side.

Table 7 indicates lens data of the numerical value example 3 wherein particular numerical values are applied to the zoom lens 3 according to the third embodiment.

TABLE 7

| Face number | Ri | Di | Ni | vi |
|---|---|---|---|---|
| 1 | −22.400 | 1.665 | 1.883 | 40.805 |
| 2 | 12.838 | 2.503 | 1.729 | 54.673 |
| 3 | 197.192 | 0.103 | | |
| 4 | 21.743 | 2.775 | 1.593 | 68.624 |
| 5 | −25.710 | 0.100 | | |
| 6(Aspheric) | 28.890 | 1.663 | 1.729 | 54.673 |
| 7 | −45.202 | Variable | | |
| 8(Aspheric) | −174.913 | 0.400 | 1.883 | 40.805 |
| 9(Aspheric) | 3.507 | 1.351 | | |
| 10 | −6.556 | 0.400 | 1.729 | 54.673 |
| 11 | 39.979 | 0.100 | | |
| 12 | 11.727 | 0.934 | 1.946 | 17.984 |
| 13 | −41.388 | Variable | | |
| 14(Aperture stop) | Infinity | 0.800 | | |
| 15(Aspheric) | 5.502 | 3.191 | 1.5273 | 56.000 |
| 16(Aspheric) | −10.509 | 0.131 | | |
| 17 | 18.591 | 0.350 | 1.904 | 31.315 |
| 18 | 6.119 | Variable | | |
| 19(Aspheric) | 6.045 | 2.809 | 1.437 | 95.100 |
| 20 | −4.308 | 0.400 | 1.911 | 35.250 |
| 21 | −5.839 | Variable | | |
| 22 | 1144.553 | 0.400 | 1.652 | 58.404 |
| 23 | 6.823 | 4.750 | | |
| 24(Aspheric) | −9.194 | 0.855 | 1.437 | 95.100 |
| 25(Aspheric) | −2.850 | 0.100 | | |
| 26 | Infinity | 0.100 | 1.517 | 64.198 |
| IMG | Infinity | 1.500 | | |

TABLE 7-continued

| Face number | Ri | Di | Ni | vi |
|---|---|---|---|---|
| IMG | Infinity | 0.500 | 1.517 | 64.198 |
| IMG | Infinity | 0.530 | | |
| IMG | Infinity | 0.000 | | |

In the zoom lens 3, the face on the object side of the positive lens L4 of the first lens group GR1, namely, the sixth face, the opposite faces of the negative lens L5 of the second lens group GR2, namely, the eighth and ninth faces, the opposite faces of the positive lens L8 of the third lens group GR3, namely, the fifteenth and sixteenth faces, the face on the object side of the positive lens L10 of the fourth lens group GR4, namely, the nineteenth face, and the opposite faces of the positive lens L13 of the fifth lens group GR5, namely, the 24th and 25th faces, are formed as aspheric faces. The fourth, sixth, eighth and tenth order aspheric coefficients A4, A6, A8 and A10 of the aspheric faces in the numerical value example 3 are indicated in Table 8 together with the conic constant κ.

TABLE 8

| Face number | κ | A4 | A6 | A8 | A10 |
|---|---|---|---|---|---|
| 6 | 0 | −4.114E−05 | −8.900E−08 | 2.115E−10 | −3.923E−12 |
| 8 | 0 | −1.804E−03 | 1.810E−04 | −3.286E−06 | −2.863E−07 |
| 9 | 0 | −3.157E−03 | 7.693E−05 | 0.000E+00 | 0.000E+00 |
| 15 | 0 | −7.140E−04 | −2.002E−05 | 2.198E−07 | −3.138E−09 |
| 16 | 0 | 6.705E−04 | −1.314E−05 | 8.781E−07 | −4.876E−09 |
| 19 | 0 | −9.655E−04 | −3.643E−06 | −8.817E−07 | 1.282E−07 |
| 24 | 0 | −1.525E−03 | 1.777E−03 | −2.202E−04 | 1.414E−05 |
| 25 | 0 | 1.258E−02 | 1.765E−03 | −2.632E−04 | 2.827E−05 |

In the zoom lens 3, upon zooming between the wide angle end state and the telephoto end state, the face distance D7 between the first lens group GR1 and the second lens group GR2, the face distance D13 between the second lens group GR2 and the aperture stop S, the face distance D18 between the third lens group GR3 and the fourth lens group GR4 and the face distance D21 between the fourth lens group GR4 and the fifth lens group GR5 vary. The variable distances in the wide angle end state, an intermediate focal length state and the telephoto end state among the face distances in the numerical value example 3 are indicated in Table 9 together with the focal length f, F number Fno. and half angle ω of view.

TABLE 9

| | Wide angle end | Intermediate | Telephoto end |
|---|---|---|---|
| f | 2.000 | 10.296 | 53.019 |
| Fno. | 1.85 | 2.50 | 4.95 |
| ω | 42.1 | 6.9 | 1.62 |
| D7 | 0.433 | 12.613 | 18.628 |
| D13 | 18.896 | 6.715 | 0.700 |
| D18 | 4.619 | 1.851 | 4.330 |
| D21 | 1.000 | 3.769 | 1.290 |

Figure 10:
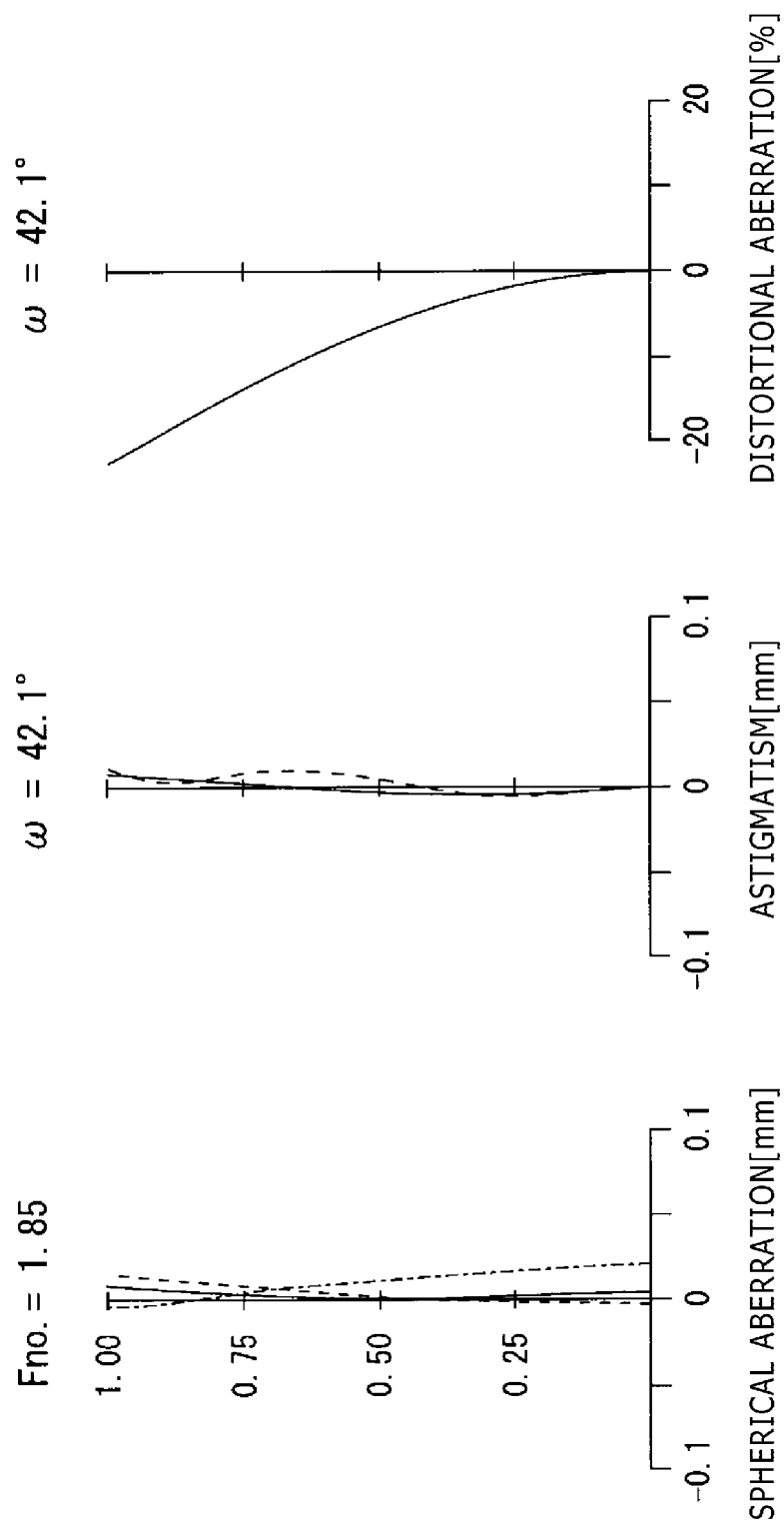
FIG. 10 is a diagrammatic view illustrating a spherical aberration, an astigmatism and a distortional aberration in a wide angle end state of the zoom lens of FIG. 9 according to a numerical value example wherein particular numerical values are applied to the zoom lens.
Figure 11:
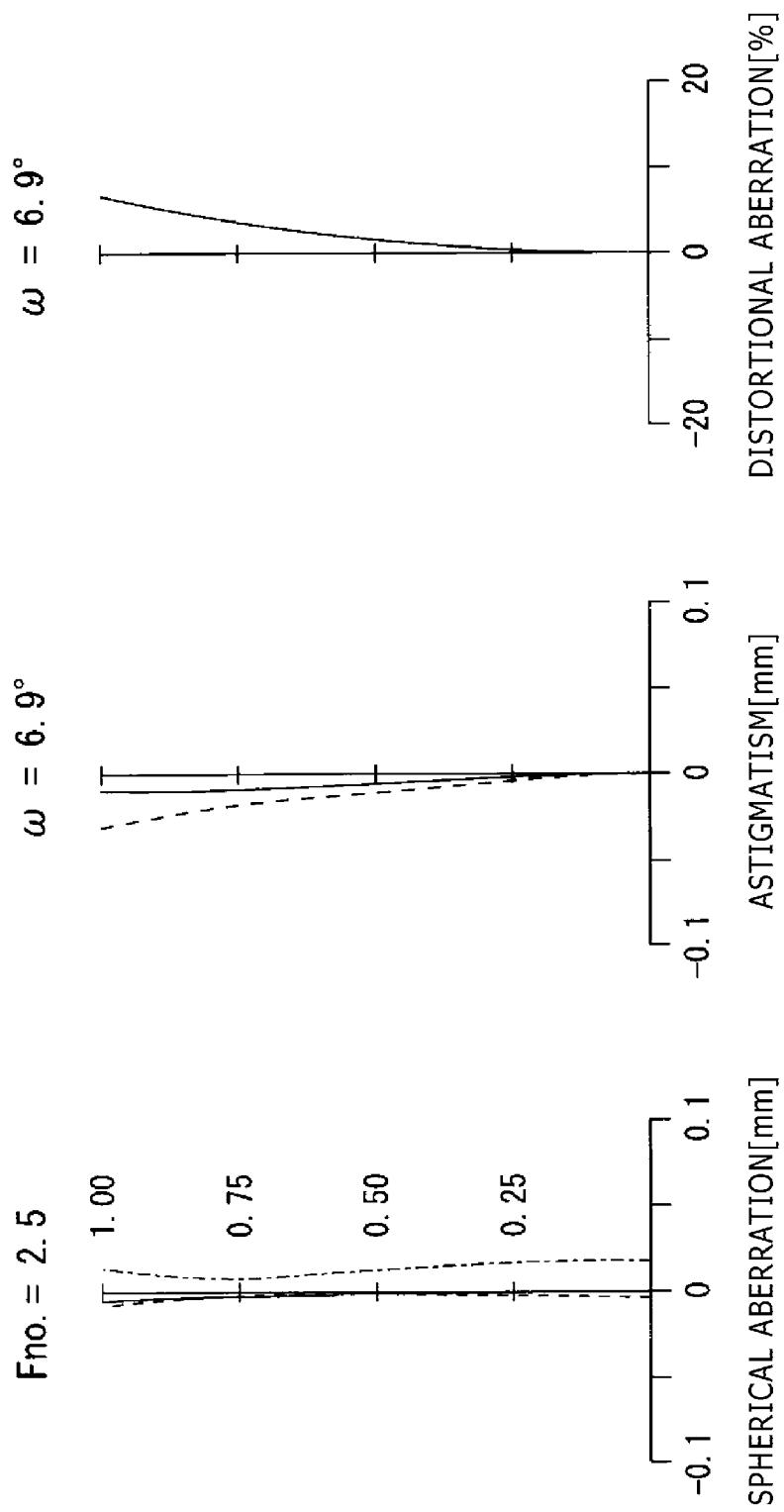
FIG. 11 is a similar view but illustrating a spherical aberration, an astigmatism and a distortional aberration in an intermediate focal length state of the zoom lens of FIG. 9.
Figure 12:
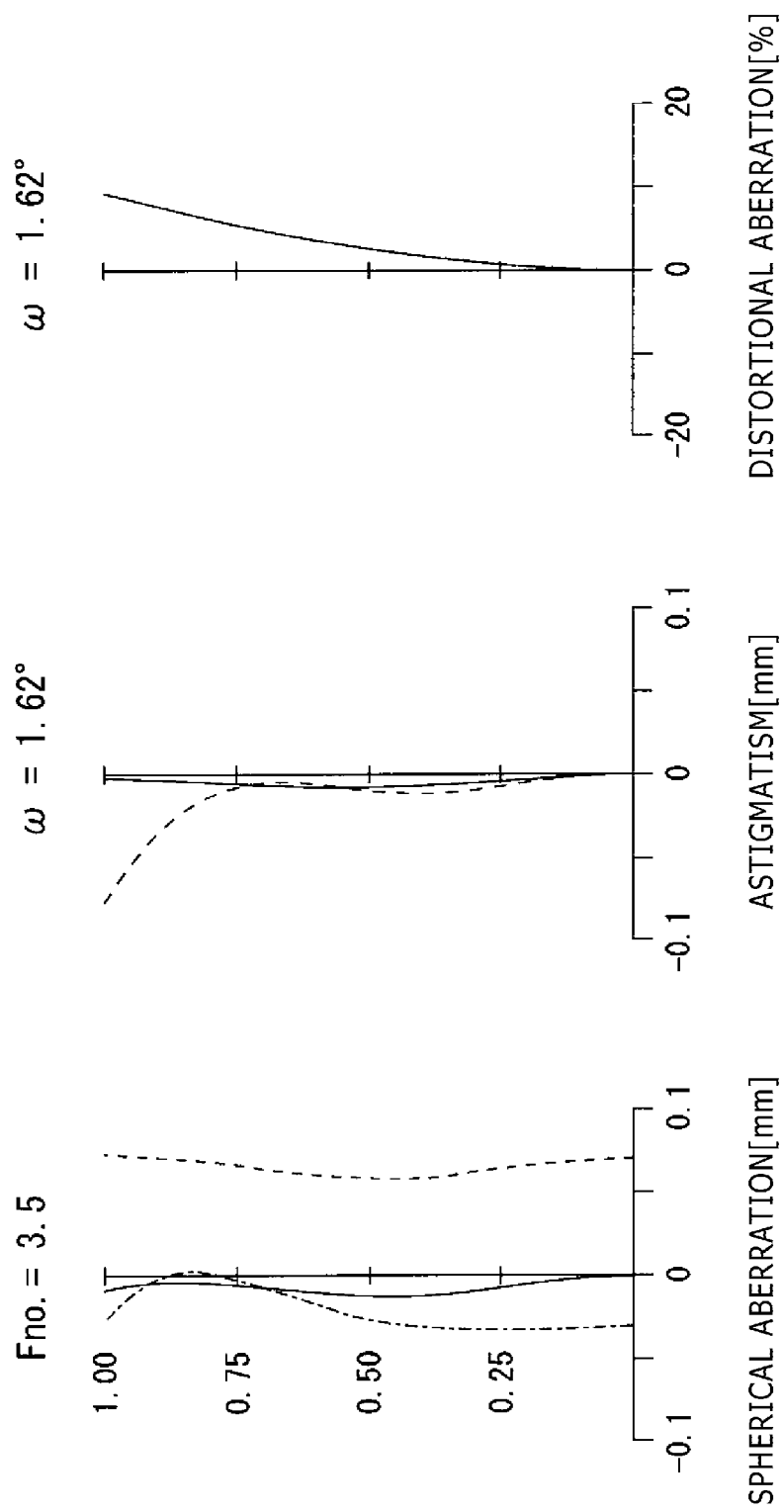
FIG. 12 is a similar view but illustrating a spherical aberration, an astigmatism and a distortional aberration in a telephoto end state of the zoom lens of FIG. 9.

FIGS. 10 to 12 illustrate various aberrations in an infinitely remotely focused state in the numerical value example 3. Particularly, FIG. 10 illustrates various aberrations in the wide angle end state; FIG. 11 illustrates various aberrations in an intermediate focal length state; and FIG. 12 illustrates various aberrations in the telephoto end state.

In spherical aberration diagrams of FIGS. 10 to 12, a solid line curve indicates values on the d line (wavelength: 587.56 nm); a broken line curve indicates values on the C line (wavelength: 656.3 nm); and an alternate long and short dash line curve indicates values on the g line (wavelength: 435.8 nm). In astigmatism diagrams, a solid line curve indicates values on the sagittal image plane of the d line; and a broken line curve indicates values on the meridional image plane of the d line. In distortional aberration diagrams, a solid line indicates values on the d line.

From the aberration diagrams, it can be recognized apparently that the numeral value example 3 has a superior imaging performance in that the aberrations are corrected favorably.

[Values of the Conditional Expressions of the Zoom Lens]

In the following, values of the conditional expressions of the zoom lens according to the embodiment of the present technology are described.

Values of the conditional expressions (1) to (3) of the zoom lenses 1 to 3 are indicated in Table 10.

TABLE 10

|  |  | Zoom lens 1 | Zoom lens 2 | Zoom lens 3 |
|---|---|---|---|---|
|  | fw | 3.200 | 2.20 | 2.000 |
|  | ft | 56.00 | 50.60 | 53.00 |
| Conditional expression (1) | ft/fw | 17.5 | 23.0 | 26.5 |
|  | f1 | 28.45 | 26.03 | 20.48 |
| Conditional expression (2) | f1/fw | 8.89 | 11.83 | 10.24 |
|  | fL1 | −17.66 | −16.98 | −8.98 |
| Conditional expression (3) | fL1/fw | −5.52 | −7.72 | −4.49 |

As apparently seen from Table 10, the zoom lenses 1 to 3 are configured so as to satisfy the conditional expressions (1) to (3).

[Configuration of the Image Pickup Apparatus]

The image pickup apparatus according to the embodiment of the present technology includes a zoom lens including a first lens group having a positive refracting power and normally positioned at a fixed position, a second lens group having a negative refracting power and movable in the direction of an optical axis for zooming, a third lens group having a positive refracting power, and a fourth lens group movable in the direction of the optical axis for correction of a focal position by zooming and for focusing, the first, second, third and fourth lens groups being disposed in order from the object side to the image side, the first lens group comprising three lenses including a negative lens, a positive lens and another positive lens disposed in order from the object side to the image side and satisfying the following conditional expressions (1), (2) and (3):

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

The conditional expression (1) defines a ratio in focal length of the entire lens system in the wide angle end state and the telephoto end state.

The conditional expression (2) relates to the focal length of the first lens group.

If the upper limit of the conditional expression (2) is exceeded, then the refracting power of the first lens group becomes excessively low and the size of the first lens group in the diametrical direction becomes extremely great. Further, an adverse effect that a flux of light is eclipsed by a great amount at an intermediate image height occurs.

On the contrary, if the lower limit of the conditional expression (2) is exceeded, then although reduction in diameter of the first lens group is possible, the refracting power of the first lens group becomes excessively high and aberration correction becomes difficult.

Accordingly, the image pickup apparatus according to the embodiment of the present technology can achieve reduction in diameter of the zoom lens while it assures a wide angle of 33 mm or less in an equivalent angle of view of 35 mm, a magnification around ten times and a high resolution which satisfies high density can be anticipated.

The conditional expression (3) defines the ratio between the focal length of the negative lens of the first lens group and the focal length of the entire lens system at the wide angle end.

If the lower limit of the conditional expression (3) is exceeded, then the action of decreasing the light flux height becomes weak, resulting in difficulty to achieve reduction in diameter.

If the upper limit of the conditional expression (3) is exceeded conversely, then the refracting power of the negative lens of the first lens group becomes excessively high, resulting in difficulty in aberration correction.

Accordingly, the zoom lens according to the embodiment of the present technology has a high resolution which can sufficiently satisfy a wide angle of 33 mm or less in an equivalent angle of view of 35 mm, increase of magnification around 20 to 30 times and a high density (HD) and besides can achieve reduction in diameter.

Further, the height of a flux of light over an overall range of the zoom region can be lowered to achieve reduction in diameter and carry out good aberration correction.

In the image pickup apparatus according to the embodiment of the present technology, electronic zooming which varies the reading out region of the image pickup device can be carried out within a predetermined zooming interval in an intermediate zoom region.

By varying the reading out region of the image pickup device in the predetermined zooming interval in the intermediate zoom region, a distorted variation of the zoom speed during zooming can be suppressed, and observation of an eclipse by the user can be prevented.

It is to be noted that, if the amount of the eclipse becomes excessively great, then it is necessary to apply electronic zooming by a greater amount and this gives rise to deterioration of the resolution. However, in the present technology, in order to eliminate the necessity to apply high electron zooming, the expressions (2) and (3) are set.

[Embodiment of the Image Pickup Apparatus]

Figure 13:
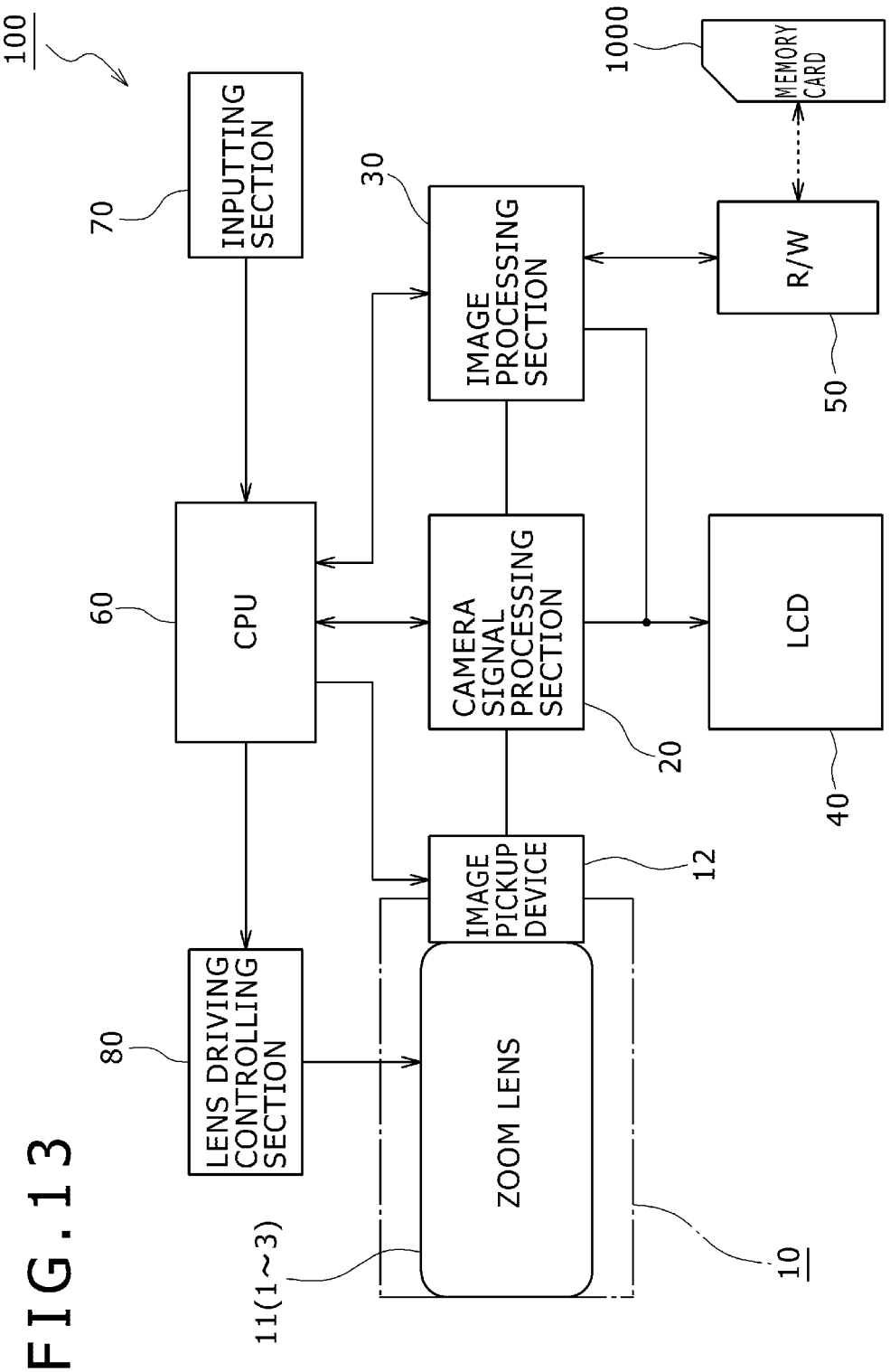
FIG. 13 is a block diagram showing an example of an image pickup apparatus according to an embodiment of the present technology.

FIG. 13 shows a block diagram of a digital still camera which is a form of the image pickup apparatus according to the embodiment of the present technology.

Referring to FIG. 13, an image pickup apparatus 100 in the form of a digital still camera includes a camera block 10 which takes charge of an image pickup function, and a camera signal processing section 20 for carrying out signal processing of an image signal picked up by the camera block 10 such as analog to digital conversion. The image pickup apparatus 100 further includes an image processing section 30 for carrying out a recording and reproduction process of the image signal. The image pickup apparatus 100 further includes an LCD (Liquid Crystal Display) unit 40 for displaying a picked up image and so forth thereon, and a reader/writer (R/W) 50 for carrying out writing and reading out of an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving controlling section 80 for controlling driving of the lens disposed in the camera block 10.

The camera block 10 is configured from an optical system including a zoom lens 11, which may be any of the zoom lenses 1, 2 and 3 to which an embodiment of the present technology is applied, an image pickup device 12 such as a CCD (Charge Coupled Device) unit or a CMOS (Complementary Metal-Oxide Semiconductor) unit, and so forth.

The camera signal processing section 20 carries out various signal processes for an output signal of the image pickup device 12 such as conversion into a digital signal, noise removal, picture quality correction and conversion into luminance and color difference signals.

The image processing section 30 carries out compression coding and decompression decoding processes of an image signal based on a predetermined image data format, a conversion process of data specifications of a resolution and so forth, and other necessary processes.

The LCD unit 40 has a function of displaying thereon an operation state of the inputting section 70 by the user and various data such as a picked up image.

The reader/writer 50 carries out writing of image data encoded by the image processing section 30 into the memory card 1000 and reading out of image data recorded in the memory card 1000.

The CPU 60 functions as a controlling processing section for controlling the circuit blocks provided in the image pickup apparatus 100 and controls the circuit blocks based on an instruction input signal from the inputting section 70 and so forth.

The inputting section 70 is configured, for example, from a shutter release button for triggering a shutter motion, a selection switch for selecting an operation mode and other necessary elements. The inputting section 70 outputs an instruction input signal corresponding to an operation by the user to the CPU 60.

The lens driving controlling section 80 controls a motor and other members not shown for driving the lenses of the zoom lens 11 based on a control signal from the CPU 60.

The memory card 1000 is a semiconductor memory which is removably inserted, for example, into a slot connected to the reader/writer 50.

In the following, operation of the image pickup apparatus 100 is described.

In a standby state for image pickup, an image signal picked up by the camera block 10 is outputted to the LCD unit 40 through the camera signal processing section 20 under the control of the CPU 60 and displayed as a camera-through image on the LCD unit 40. On the other hand, if an instruction input signal for zooming is inputted from the inputting section 70, then the CPU 60 outputs a control signal to the lens driving controlling section 80 so that predetermined lenses of the zoom lens 11 are moved under the control of the lens driving controlling section 80.

If the shutter not shown of the camera block 10 is driven to move in response to the instruction input signal from the inputting section 70, then a picked up image signal is outputted from the camera signal processing section 20 to and subjected to a compression coding process by the image processing section 30, by which it is converted into digital data of a predetermined data format. The resulting data is outputted to the reader/writer 50 and written into the memory card 1000.

Focusing is carried out by the lens driving controlling section 80 moving the predetermined lenses of the zoom lens 11 based on a control signal from the CPU 60, for example, when the shutter release button of the inputting section 70 is half-depressed or is fully depressed for recording or image pickup.

In order to reproduce image data recorded in the memory card 1000, predetermined image data is read out from the memory card 1000 in response to an operation for the inputting section 70 by the reader/writer 50, and a decompression decoding process is carried out for the image data by the image processing section 30. Then, a reproduction image signal is outputted from the image processing section 30 to the LCD unit 40 so that a reproduction image is displayed on the LCD unit 40.

It is to be noted that, while the embodiment described above is directed to an example wherein the image pickup apparatus is applied to a digital still camera, the application range of the image pickup apparatus is not limited to the digital still camera. In particular, the image pickup apparatus can be applied widely as a camera section or the like of a digital inputting and outputting function of a digital video camera, a portable telephone set in which a camera is incorporated, a PDA (Personal Digital Assistant) in which a camera is incorporated and like apparatus.

[Others]

In the zoom lens and the image pickup apparatus according to the embodiment of the present technology, a lens which has substantially no lens power may be disposed, a lens group including such lens may be disposed in addition to the first to fifth lens groups. In this instance, the zoom lens and the image pickup apparatus according to the embodiment of the present technology may be configured from substantially six or more lens groups including the lens disposed in addition to the first to fifth lens groups.

[Present Technology]

The present technology can be configured also in the following configurations.

In a first configuration, the present technology is a zoom lens, including:

a first lens group having a positive refracting power and normally positioned at a fixed position;

a second lens group having a negative refracting power and movable in the direction of an optical axis for zooming;

a third lens group having a positive refracting power; and a fourth lens group movable in the direction of the optical axis for correction of a focal position by zooming and for focusing;

the first, second, third and fourth lens groups being disposed in order from the object side to the image side;

the first lens group comprising three lenses including a negative lens, a positive lens and another positive lens disposed in order from the object side to the image side and satisfying the following conditional expressions (1), (2) and (3):

$$15.0 < ft/fw < 31.0 \tag{1}$$

$$7.0 < f1/fw < 13.0 \tag{2}$$

$$-8.5 < fL1/fw < -4.0 \tag{3}$$

where fw is the focal length of the entire lens system in a wide angle end state, ft is the focal length of the entire lens system in a telephoto end state, f1 is the focal length of the first lens group, and fL1 is the focal length of the negative lens of the first lens group.

The first configuration may additionally be configured wherein at least one face of the lenses of the first group is formed as an aspheric face. least one face of the lenses of the first lens group is formed as an aspheric face.

The first configuration may additionally or alternatively be configured wherein the fourth lens group has a positive refracting power.

The first configuration may additionally or alternatively be configured further including a fifth lens group having a positive refracting power and disposed on the image side of the fourth lens group.

In a second configuration, the present technology is an image pickup apparatus, including:
a zoom lens; and
an image pickup device configured to convert an optical image formed by the zoom lens into an electric signal;
the zoom lens including
a first lens group having a positive refracting power and normally positioned at a fixed position,
a second lens group having a negative refracting power and movable in a direction of an optical axis for zooming,
a third lens group having a positive refracting power, and
a fourth lens group movable in the direction of the optical axis for correction of a focal position by zooming and for focusing;
the first, second, third and fourth lens groups being disposed in order from the object side to the image side;
the first lens group comprising three lenses including a negative lens, a positive lens and another positive lens disposed in order from the object side to the image side and satisfying the following conditional expressions (1), (2) and (3):

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

The second configuration may additionally be configured wherein a reading out region of the image pickup device is changed within a predetermined zooming interval in an intermediate zoom region. wherein a reading out region of the image pickup device is changed within a predetermined zooming interval in an intermediate zoom region.

The first or second configuration, respectively, may additionally or alternatively be configured wherein a lens which has substantially no lens power is disposed.

The shapes and the numerical values of the components specified in the embodiments described hereinabove are mere examples of embodiments in carrying out the present technology, and the technical scope of the present technology shall not be interpreted restrictively by them.

The present application contains subject matter related to that disclosed in Japanese Priority Patent Application JP 2011-272383 filed in the Japan Patent Office on Dec. 13, 2011, the entire content of which is hereby incorporated by reference.

What is claimed is:

1. A zoom lens, comprising:
a first lens group having a positive refracting power and normally positioned at a fixed position;
a second lens group having a negative refracting power and movable in the direction of an optical axis for zooming;
a third lens group having a positive refracting power; and
a fourth lens group movable in the direction of the optical axis for correction of a focal position by zooming and for focusing;
the first, second, third and fourth lens groups being disposed in order from the object side to the image side;
the first lens group comprising three lenses including a negative lens, a positive lens and another positive lens disposed in order from the object side to the image side and satisfying the following conditional expressions (1), (2) and (3)

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

2. The zoom lens according to claim 1, wherein a face of the lenses of the first lens group is formed as an aspheric face.

3. The zoom lens according to claim 1, wherein the fourth lens group has a positive refracting power.

4. The zoom lens according to claim 1, further comprising:
a fifth lens group having a positive refracting power and disposed on the image side of the fourth lens group.

5. The zoom lens according to claim 1, further comprising a lens which has substantially no lens power.

6. An image pickup apparatus, comprising:
a zoom lens; and
an image pickup device configured to convert an optical image formed by the zoom lens into an electric signal;
the zoom lens including
a first lens group having a positive refracting power and normally positioned at a fixed position,
a second lens group having a negative refracting power and movable in a direction of an optical axis for zooming,
a third lens group having a positive refracting power, and
a fourth lens group movable in the direction of the optical axis for correction of a focal position by zooming and for focusing;
the first, second, third and fourth lens groups being disposed in order from the object side to the image side;
the first lens group comprising three lenses including a negative lens, a positive lens and another positive lens disposed in order from the object side to the image side and satisfying the following conditional expressions (1), (2) and (3)

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

7. The image pickup apparatus according to claim 6, wherein a reading out region of the image pickup device is changed within a predetermined zooming interval in an intermediate zoom region.

8. The image pickup apparatus according to claim 6, wherein a face of the lenses of the first lens group is formed as an aspheric face.

9. The image pickup apparatus according to claim 6, wherein the fourth lens group has a positive refracting power.

10. The image pickup apparatus according to claim 6, further comprising:
   a fifth lens group having a positive refracting power and disposed on the image side of the fourth lens group.

11. A zoom lens, comprising:
   a first lens group having a positive refracting power and normally positioned at a fixed position;
   a second lens group having a negative refracting power and movable in the direction of an optical axis for zooming;
   a third lens group having a positive refracting power;
   a fourth lens group having a positive refracting power, which is movable in the direction of the optical axis for correction of a focal position by zooming and for focusing; and
   a fifth lens group having a positive refractive power and disposed on the image side of the fourth lens group,
   the first, second, third, fourth and fifth lens groups being disposed in order from the object side to the image side;
   the first lens group comprising three lenses including a negative lens, a positive lens and another positive lens disposed in order from the object side to the image side and satisfying the following conditional expressions (1), (2) and (3)

$$15.0 < ft/fw < 31.0 \quad (1)$$

$$7.0 < f1/fw < 13.0 \quad (2)$$

$$-8.5 < fL1/fw < -4.0 \quad (3)$$

where fw is the focal length of the entire lens system in a wide angle end state, ft is the focal length of the entire lens system in a telephoto end state, f1 is the focal length of the first lens group, and fL1 is the focal length of the negative lens of the first lens group.

12. The zoom lens according to claim 11, wherein a face of the lenses of the first lens group is formed as an aspheric face.

13. The zoom lens according to claim 11, further comprising a lens which has substantially no lens power.

14. An image pickup device comprising:
   the zoom lens according to claim 11; and
   an image pickup device configured to convert an optical image formed by the zoom lens into an electric signal.

* * * * *